(12) United States Patent
Brusky et al.

(10) Patent No.: US 6,604,157 B1
(45) Date of Patent: Aug. 5, 2003

(54) SYSTEM AND METHOD FOR ALLOWING A USER TO SELECT AND SCAN FROM A PERIPHERAL TO A TARGET APPLICATION ON A HOST SYSTEM

(75) Inventors: Kevin J. Brusky, Magnolia, TX (US); Montgomery C. McGraw, Spring, TX (US); Derrill L. Sturgeon, Spring, TX (US)

(73) Assignee: Hewlett-Packard Development Company, Houston, TX (US)

(*) Notice: Subject to any disclaimer, the term of this patent is extended or adjusted under 35 U.S.C. 154(b) by 0 days.

(21) Appl. No.: 09/253,197

(22) Filed: Feb. 19, 1999

(51) Int. Cl.[7] .............................................. G06F 13/00
(52) U.S. Cl. ................. 710/65; 710/7; 710/20; 710/72; 709/310; 709/329
(58) Field of Search ................. 709/200, 203, 709/310–313; 710/7, 12–15, 20, 33–35, 65, 72–74; 358/422

(56) References Cited

U.S. PATENT DOCUMENTS

| | | | | |
|---|---|---|---|---|
| 5,361,134 A | | 11/1994 | Hu et al. ...................... 358/296 |
| 5,477,238 A | | 12/1995 | Aharanson et al. ......... 345/168 |
| 5,596,753 A | * | 1/1997 | Bhatt .......................... 709/302 |
| 5,600,800 A | | 2/1997 | Kikinis et al. |
| 5,680,223 A | | 10/1997 | Cooper et al. |
| 5,764,866 A | * | 6/1998 | Maniwa ....................... 358/422 |
| 5,867,718 A | | 2/1999 | Intrater et al. ............... 713/323 |
| 5,911,044 A | * | 6/1999 | Lo et al. ...................... 709/203 |
| 5,915,106 A | * | 6/1999 | Ard ............................... 703/23 |
| 6,003,093 A | * | 12/1999 | Kester .......................... 709/301 |
| 6,101,555 A | * | 8/2000 | Goshey et al. ............... 709/301 |
| 6,115,739 A | * | 9/2000 | Ogawa et al. ............... 709/215 |
| 6,161,123 A | * | 12/2000 | Renouard et al. ........... 709/203 |
| 6,195,172 B1 | | 2/2001 | Minamizawa .............. 358/1.15 |
| 6,256,662 B1 | * | 7/2001 | Lo et al. ...................... 709/203 |
| 6,292,842 B1 | * | 9/2001 | Crouch et al. .............. 709/329 |
| 6,388,771 B1 | | 5/2002 | Tamaki ........................ 358/442 |

FOREIGN PATENT DOCUMENTS

| | | |
|---|---|---|
| DE | 198 14 522 A1 | 11/1998 |
| EP | 0-532-796 A1 | 3/1993 |
| JP | 10-126560 | 5/1998 |

OTHER PUBLICATIONS

EPO Communication dated Jun. 05, 2001, and Search Report dated May 29, 2001 and Annex, re EP Application 00301017 (counterpart of US 09/253,612) (3 pages).

* cited by examiner

Primary Examiner—Christopher B. Shin

(57) ABSTRACT

A system for scanning data into a host from a peripheral location. A peripheral, such as a multifunction peripheral having printer and scanner functionality, is coupled to a host, such as a personal computer. The system includes a user interface at the peripheral that can be utilized in selecting a desired target, such as an application or file, at the host. The peripheral user interface also can be used to select a networked site, such as a networked file. Thus, a user can scan desired data at the peripheral to a remote application or file without providing input at the user interface of the host.

25 Claims, 3 Drawing Sheets

SYSTEM AND METHOD FOR ALLOWING A USER TO SELECT AND SCAN FROM A PERIPHERAL TO A TARGET APPLICATION ON A HOST SYSTEM

FIELD OF THE INVENTION

The present invention relates generally to systems utilizing peripherals in combination with a host, such as a personal computer, and particularly to a system in which a multifunction peripheral is utilized to select and scan information into a desired application or file on a host system.

BACKGROUND OF THE INVENTION

Peripherals, such as multifunction peripherals, are able to perform simple operations, such as printing, faxing and copying. Normally, multifunction peripherals can be used as stand alone devices without being connected to a host device, such as a personal computer. However, it also is common to connect peripherals to a personal computer via, for instance, parallel ports. This allows a user to utilize at least some of the functionality of the peripheral through the PC interface.

In some systems in which a personal computer is linked with a multifunction peripheral, an operation, such as scanning, can be initiated by the user from a particular application or applications used on the personal computer. Thus, the user is permitted to scan a document or other data into the open application by utilizing the user interface of the personal computer. However, use of the PC interface can be cumbersome and the procedure for scanning documents into an application can vary between applications. This can lead to frustration and confusion for the user.

For example, an exemplary sequence of steps for scanning desired data into an application on a personal computer can involve numerous steps. Initially, the application must be started or launched on the computer. The user then goes to the appropriate file menu to select a scanner. Following selection, the user returns to the file menu, and performs an "acquire to" procedure. Next, a TWAIN interface is brought up on the screen, and various preset parameters are established. Following selection of the preset parameters, e.g. color and resolution, the scan is initiated. The multifunction peripheral then scans the document into the TWAIN interface. At this stage, the document is accepted and must be moved to the desired application.

Systems may vary as to the exact procedure utilized for scanning documents via the PC interface. However, it would be advantageous to simplify these procedures, and to allow a user to scan data, e.g. images or text, into a desired application or file from a user interface of the peripheral.

SUMMARY OF THE INVENTION

The present invention features a system for inputting data from a peripheral to a target on a host system. The system includes a host having a plurality of applications. Additionally, the system includes a peripheral device having a scanner and a user interface. The host and the peripheral device are coupled across a communication link. The communication link allows data to be scanned at the scanner and transferred to a select application of the plurality of applications upon input from a user at the peripheral device user interface.

According to another aspect of the invention, a method is provided for inputting data into a desired target on a host system from a peripheral. The method includes utilizing a user interface on a peripheral to select a desired target on the host system. The method further includes initiating a scan of desired data via the user interface, and scanning the desired data. Following scanning, the desired data is transferred to a specific target, e.g. application or file, on the host system.

According to another aspect of the invention, a method is provided for inputting data to a target site on a host system. The method includes connecting a multifunction peripheral to a host computer. The method also includes utilizing the multifunction peripheral to select a target site on the host computer for receiving a data set. The data set is scanned into the target site from the multifunction peripheral.

BRIEF DESCRIPTION OF THE DRAWINGS

The invention will hereafter be described with reference to the accompanying drawings, wherein like references numerals denote like elements, and.

DETAILED DESCRIPTION OF SPECIFIC EMBODIMENTS

Figure 1:
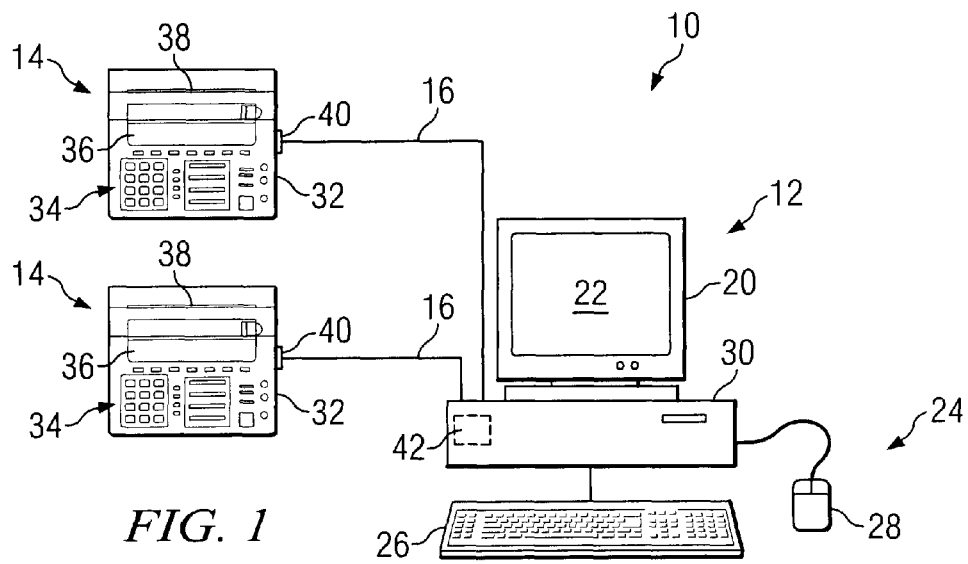
FIG. 1 is a schematic diagram of a host system coupled to a plurality of peripherals, according to a preferred embodiment of the present invention.

Referring generally to FIG. 1, an exemplary system 10 is illustrated according to an embodiment of the present invention. System 10 is one example of components that can be utilized for allowing a user to scan information from a remote peripheral directly into a host system. In this embodiment, system 10 includes a host 12 coupled to one or more peripherals 14, preferably multifunction peripherals. Host 12 is coupled to each peripheral 14 by a communication link 16. One or more peripherals 14 can be connected directly to host 12 or placed in communication with host 12 over a network.

In the exemplary embodiment illustrated, host 12 comprises a personal computer 18. Personal computer 18 may include a display 20 having a screen 22 for displaying and facilitating interaction with a user. Additionally, personal computer 18 includes a user interface 24 that may comprise for example a keyboard 26 and a mouse 28. Computer 18 also includes a central housing 30 that may enclose components, such as a CPU, a data storage medium, CD drives, disk drives, modems, etc.

Each peripheral 14 is a device or collection of devices that have scanner functionality, and typically both printer and scanner functionality. Other functions, such as fax functions, also may be included in one or more of the peripherals 14. In the embodiment illustrated in FIG. 1, each peripheral 14 can be assumed to be a multifunction peripheral having printer, scanner and fax functionality, combined in a single housing 32. However, the peripheral 14 need not have all of its functions combined in a single unit.

Each peripheral 14 also includes a user interface 34 through which a user may control the operation of the various functions of that peripheral. Typically, each peripheral 14, and specifically each interface 34, includes a display screen 36 for displaying certain operational parameters or eliciting appropriate input from a user. A wide variety of paper trays or feeders 38 may be used to deliver one or more sheets or documents to the multifunction peripheral for such operations as scanning, printing or sending facsimile transmissions. It should be noted that peripheral 14 may have a wide variety of shapes, structures, capacities and user interfaces.

Communication link 16 also may comprise a variety of forms. In the illustrated embodiment, each communication link is a hard wire link that interfaces with a parallel port 40 of peripheral 14 and a corresponding parallel port 42 of host 12. However, communication links 16 may comprise a variety of other forms that are able to transmit data between host 12 and a peripheral 14. For example, communication link 16 may be formed not only by direct wiring, but also by optical fibers, RF communication links, a variety of network applications as well as other data transfer forms.

Figure 2:
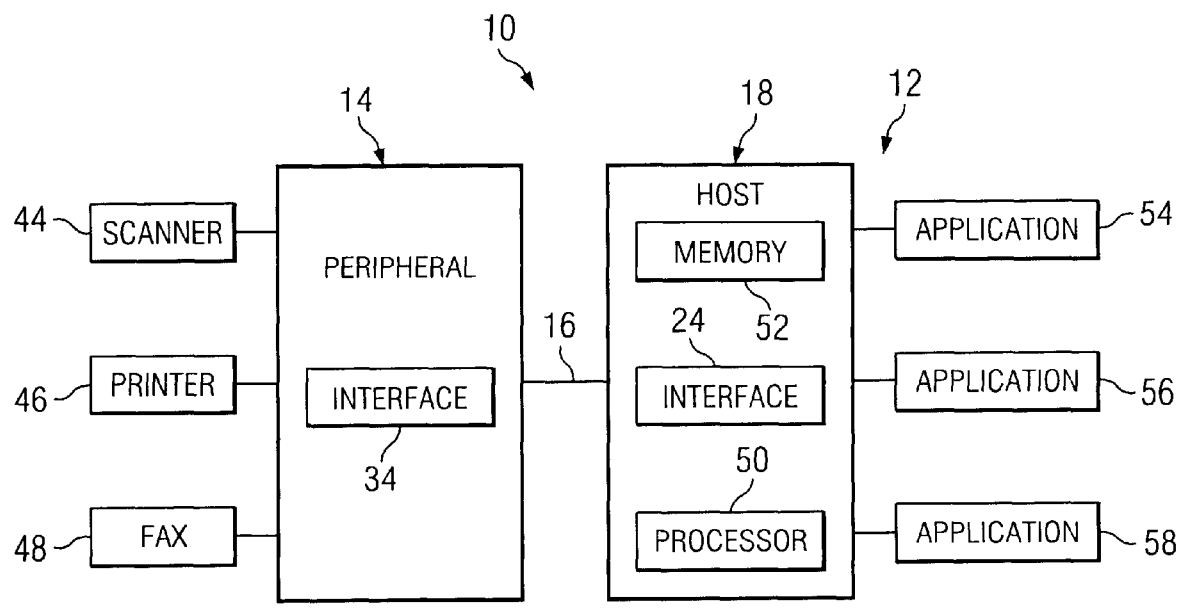
FIG. 2 is a diagrammatic illustration representing the functionality of a host system connected to a multifunction peripheral, according to a preferred embodiment of the present invention.

Referring generally to FIG. 2, a peripheral 14 is diagrammatically illustrated as connected to host 12. In this example, peripheral 14 includes at least a scanner functionality 44 and a printer functionality 46. Additionally, the peripheral may include a fax functionality 48. The scanner, printer and fax functionalities can be selected and controlled by the user interface 34.

Host 12, such as the exemplary personal computer 18, includes a CPU or processor 50 that is utilized for control of the various tasks required of personal computer 18. Additionally, host 12 includes a memory medium 52 on which data may be stored.

Host 12 also includes at least one and preferably a plurality of applications. For purposes of description, the host 12 illustrated in FIG. 2 is illustrated as having three applications 54, 56 and 58. However, numerous additional applications for a variety of desired tasks potentially may be utilized on a host 12. For example, if host 12 comprises personal computer 18, a variety of applications, such as word processing applications, drawing applications, spreadsheet applications, and numerous other applications may be utilized.

In any of the applications 54, 56 or 58 it may be desirable to import data from other documents or items. A typical procedure for accomplishing this desired task has been to connect host 12 to a scanner and to utilize interface 24 of host 12 to scan and import the data into the application. However, existing procedures have been cumbersome, as explained above. Thus, the present invention permits a user to transfer data scanned at peripheral 14 into the desired application 54, 56 or 58 on host 12 without utilizing host interface 24. The user may control the scanning of data into the desired application from peripheral interface 34 at peripheral 14.

Figure 3:
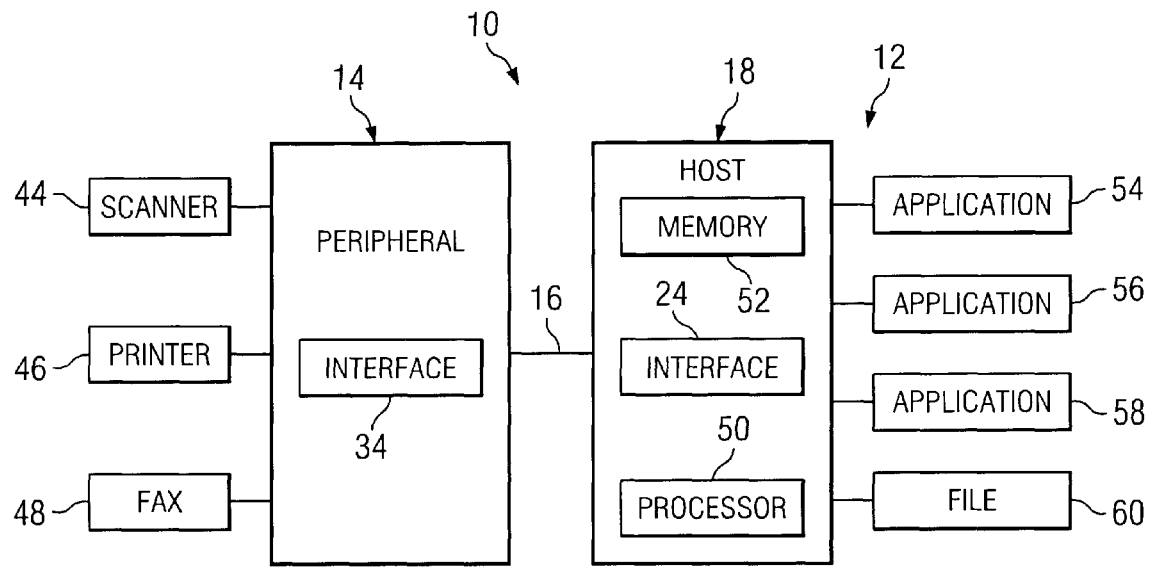
FIG. 3 is a diagrammatic illustration similar FIG. 2 but showing a modified embodiment.
Figure 4:
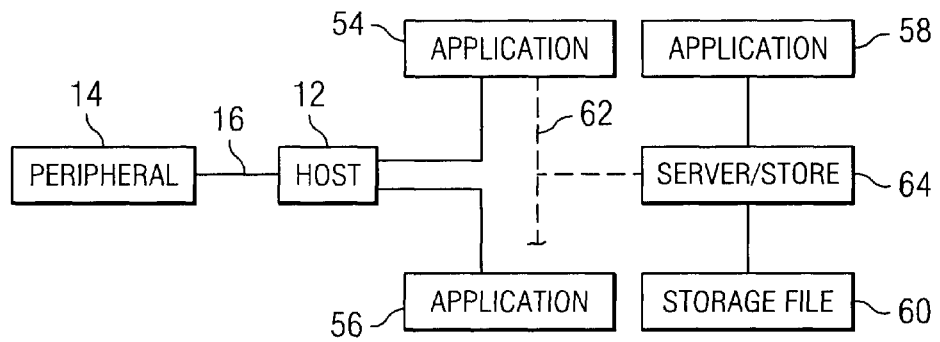
FIG. 4 is a diagrammatic illustration similar to FIG. 2, but showing a modified embodiment.
Figure 4A:
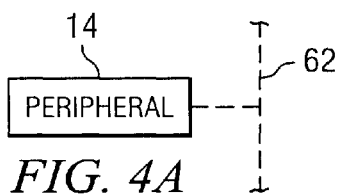
FIG. 4A illustrates a modification of the embodiment shown in FIG. 4.

As illustrated in FIG. 3, peripheral 14 can also be used to scan a desired data set into a storage file 60. If host 12 comprises personal computer 18, storage file 60 may reside in, for instance, a hard drive. Alternatively, storage file 60 can be a networked file, as illustrated best in FIG. 4. In the latter embodiment, host 12 is connected to a network 62 which, in turn, is connected to a storage device, such as a server 64. Peripheral 14 may be coupled to host 12 or directly to network 62 as illustrated in FIG. 4A. If peripheral 14 is connected directly to network 62, data transmitted to a specific storage file 60 must be properly addressed for transmission to either host 12 or the networked storage medium 64.

Figure 5:
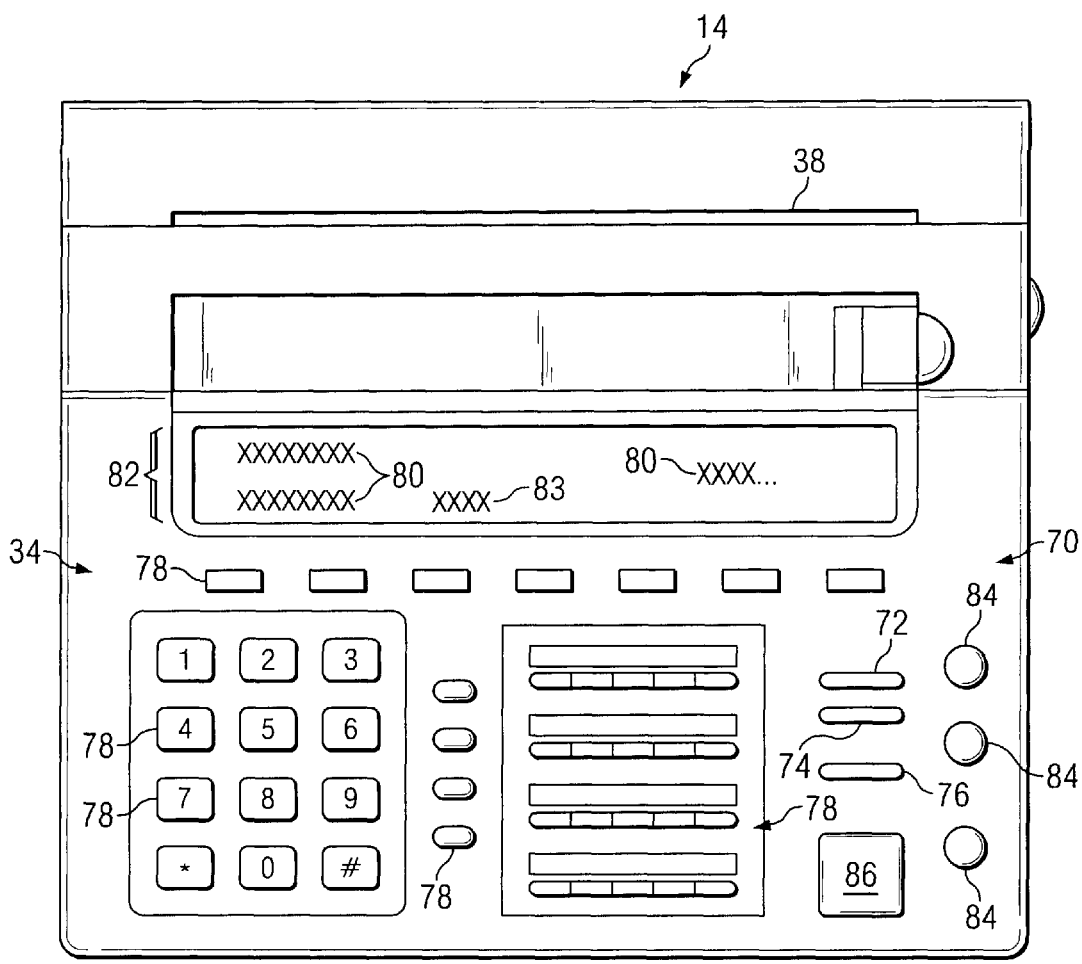
FIG. 5 illustrates an exemplary user interface of a multifunction peripheral.

Referring generally to FIG. 5, an exemplary peripheral user interface 34 is illustrated. It should be noted that the present invention does not rely on a specific user interface and, accordingly, a wide variety of interfaces potentially can be used. However, one exemplary embodiment of peripheral user interface 34 is illustrated in FIG. 5.

Peripheral interface 34 utilizes a variety of input keys, such as function initiation keys 70. By way of example, function initiation keys 70 may include a scan key 72, a copy key 74 and/or a fax key 76. When a function, such as "scan" is selected by pressing scan key 72, a variety of preset parameters may be selected via a plurality of input keys 78. For example, certain input keys 78 may control quality of scan, paper size, contrast, darkness and potentially a variety of other parameters, as are available on conventional peripherals. Also, the display screen 36 can be used to elicit various inputs from a user by a plurality of prompts 80. For example, a menu 82 may be displayed that permits a user to select various parameters, via input keys 78, that relate to the function, e.g. scanning, to be performed.

Additionally, peripheral interface 34 is utilized to select the desired application 54, 56 or 58 or the desired storage file 60 into which the subject data set is to be scanned. There are a variety of methods that can be used to select the desired application or storage file. For example, a plurality of selection keys 84 can be dedicated to specific applications and/or files on host 12. Actuating one of the selection keys 84 effectively selects a specific corresponding target site, e.g. application or file. Alternatively, the user can be allowed to establish which target sites, e.g. applications or files, that he may want to scan documents or other items into. This information can be transmitted to peripheral 14 across its corresponding communication link 16 for storage until altered by the user. Preferably, the host is configured to receive input from the user as to which files or applications have been selected for direct transfer of data from the peripheral.

Once the desired applications and/or files are established at the peripheral 14, display 36, and specifically prompts 80, also can be used to prompt the user to select the desired application. For example, the desired target sites preferably are established as a submenu 83 of menu 82. This allows a user to select a target site, if any, while establishing the preset parameters related to the scan function. Following selection of the desired preset parameters and the desired target site, the user simply presses an actuation key, e.g. a start key 86, to initiate the scanning of desired data to a specific application or file on host system 12. It should be noted that host system 12 also can include networked files that may be located at a separate storage medium, such as server 64.

Upon actuation of start key 86, an alert signal is sent from peripheral 14 over communication link 16 to host 12. Upon receipt of the alert signal, processor 50 outputs a query signal to peripheral 14, via communication link 16. The query is utilized to ascertain the various preset parameters regarding the specific function initiated by the user, including the application or file into which the desired data set should be scanned.

Once the preset parameters are obtained by host 12, the data set, e.g. document, is scanned by scanner 44 and transferred to memory medium 52. Here, processor 50 performs any required data manipulation such as that required by the preset parameters, and sends the data to the desired application or file. Thus, desired information can readily by scanned into a desired target site on a host system 12 by utilizing a peripheral interface 34.

During manipulation of the data, it may be necessary to convert the data into a form readily usable by the target application. For example, if the application, such as application 56, is a text based application, then images scanned by scanner 44 must be converted into a text file. For example, optical character recognition (OCR) may be used during scanning of images to facilitate conversion of the images into an appropriate text file instead of into a bit map, thereby allowing the data to be edited in the text based application. Preferably, the scanned information is passed to the target application in the best form for use in that application.

Figure 6:
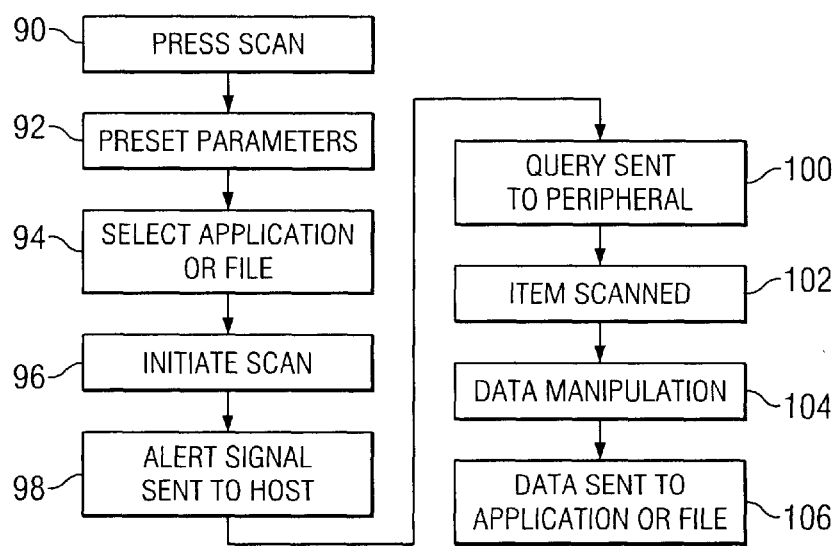
FIG. 6 is a block diagram illustrating the steps of scanning from a peripheral to a desired target site, according to a preferred embodiment of the present invention.

A specific exemplary operation of system 10 has been set forth in block diagram format in FIG. 6. The operation is initiated when scan key 72 is actuated (see block 90 of FIG. 6), and various parameters related to the scanned data are set via input keys 78 (see block 92). The preset parameters may either be default values or values specifically selected via input key 78. Depending on the type of user interface 34, the parameter selections may be elicited from a user via prompts 80 in a menu 82.

Following the selection of preset parameters, a target site, such as a specific application or file into which the desired data is to be scanned, is selected (block 94). If a menu based prompting is utilized, the various selections regarding applications and/or files into which the information may be scanned can be presented to the user by virtue of submenu 83.

After selection of the target site and any other desired preset parameters, the scan is initiated by actuating start key 86 (see block 96). Pressing start key 86 causes an alert signal to be sent to host 12 (see block 98). Upon receipt of the alert signal, host 12 queries the peripheral 14 to ascertain the preset parameters, including the target site into which the desired data is to be scanned (see block 100).

After obtaining the parameters related to the data to be scanned, the data set, e.g. text and/or image, is scanned by scanner 44 and transmitted to host 12, specifically into memory medium 52 (see block 102). Here, the data may be manipulated according to the various preset parameters (see block 104) and then transmitted to the desired target site, e.g. application 54, 56, 58 or file 60 (see block 106). At this stage, the data set is ready for use in the target application or properly stored at the desired target file.

It will be understood that the foregoing description is of preferred embodiments of this invention, and that the invention is not limited to the specific forms shown. For example, a variety of hosts may be utilized in the system; a variety of peripherals, including multifunction peripherals having copying, printing and faxing capabilities, can be employed; the communication link can be provided in a variety of forms; the methods of data transfer can be adjusted or changed, as would be understood by those of ordinary skill in the art; the peripheral user interface as well as the host user interface can take a variety of forms; and various processors and memory media can be utilized in the host system for controlling the transfer of data as well as the manipulation of data. These and other modifications may be made in the design and arrangement of the elements without departing from the scope of the invention as expressed in the appended claims.

What is claimed is:

1. A system for inputting data from a peripheral to a target on a host system, comprising:
   a host including a processor having access to memory and having a plurality of application programs;
   a peripheral device having a scanner and a user interface operable to initiate operation of the scanner and to select an application program from said plurality of host application programs; and
   a communication link through which the peripheral is coupled to the host, wherein in response to input to the user interface of the peripheral device to initiate operation of said scanner, an alert signal is communicated to said host, said host processor responding to said alert signal by querying said peripheral device to identify the application program selected by user interface input, and data generated by operation of the scanner is transferred without storage at the peripheral device to said host memory;
   said host processor operable to convert said scanned data stored by said host memory to a file formatted for functional compatibility with said identified application program and to transfer said formatted file to said application program.

2. The system as recited in claim 1, wherein said application is a text based application program and said scanned data is converted into a text file compatible with said text based application program.

3. The system as recited in claim 1, further comprising a network to which the host is coupled, and a storage medium coupled to the network, wherein the user interface of the peripheral device is also operable to transfer data scanned at the scanner to the storage medium.

4. The system as recited in claim 3, wherein the peripheral device is coupled directly to the network.

5. The system as recited in claim 1, wherein the user interface includes a plurality of input keys.

6. The system as recited in claim 5, wherein the user interface includes a display screen.

7. The system as recited in claim 1, wherein the peripheral device also incorporates an integral printer functionality.

8. The system as recited in claim 1, wherein the host comprises a personal computer.

9. A system for inputting data from a peripheral to a host including memory and supporting a plurality of application programs, comprising:
   a peripheral device including a peripheral user interface and a scanner device;
   a communication link through which communication between said peripheral device and said host can be established;
   said peripheral user interface is operable to select a desired one of said host application programs and to initiate operation of said scanner device to signal said host to enable the host to query the peripheral device to determine said selected host application program, and to operate the scanner device to generate scan data and to transfer said scan data over said communication link to said memory, said host operable to transfer said scanned data from said memory to said selected host application program in a file format functionally compatible with use by operation of said application program.

10. A system according to claim 9, wherein said peripheral user interface is also operable to permit selection of parameters affecting said scanner operation.

11. A system according to claim 10, wherein said host application programs include at least a word processing application program and a spreadsheet application program.

12. A system according to claim 11, wherein the host is operable to manipulate scanned image data stored in said memory to create a text format file to transfer to said word processing application program.

13. A system according to claim 12, wherein said host computer is coupled to a network which includes at least one application selectable by input to said peripheral user interface.

14. A system according to claim 12, wherein said selected host application program is a text based application program and said host is operable to convert scanned image data to a text data format functionally compatible with said text based application program prior to transfer to said text based application program.

15. A method of communicating scan data from a peripheral device to a host, comprising:

operating a peripheral device user interface to select parameters associated with said scan operation including identification of one of a plurality of application programs supported by said host, and to initiate in sequence (a) querying the peripheral device by said host to determine said selected host application program, and commencing a scan operation by said peripheral device to generate scan data and (b), without storing said scan data at said peripheral device, transfer of said scan data over a communication link to memory accessible by said host, and operating said host to process said scanned data to a file formatted to be functionally compatible with said selected application program and loading said formatted file into said selected host application program.

16. A method according to claim 15, further comprising operating said peripheral device user interface to select scan conditions controlling said scan operation.

17. A method according to claim 15, wherein said transfer of scan data to the host accessible memory is effected without storage at the peripheral device.

18. A method according to claim 15, wherein the selected host application program is a text based application and wherein said host processing converts scanned image data into text file format.

19. A method of communicating scan data from a peripheral device to a remote memory accessible by a host supporting a plurality of application programs, comprising:

operating a peripheral device user interface to select desired parameters relating to data to be scanned during a scan operation and to select one of said host application programs; and subsequently operating said peripheral device user interface to send an alert signal to the host and in response to a query from the host, communicating to the host at least identification of the selected application program; performing a scan operation by said peripheral device utilizing at least some of said selected parameters to generate scan data; and transferring said scan data over a communications link to the remote host accessible memory; operating the host to transfer the scan data from said memory to the selected host application program in a format functionally compatible with operation of said application program.

20. A method according to claim 19, wherein the selected application program is a word processing application program and the host converts scanned image data to a text file functionally compatible with the selected application program.

21. A method according to claim 19, wherein the selected application program is a text based application and wherein image data in said scan data converted it into a text file compatible with operation of the selected application program.

22. A computer system having a host and a peripheral device, and a communications link operable to enable communication between said host and said peripheral device, said host including a processor having access to memory and supporting a plurality of application programs, including at least scan functionality, said peripheral device comprising:

a scanner operable to generate scan data and having a user interface including a display, said user interface operable to provide user input to the peripheral device including input to select one or more parameters for use in conjunction with the scanner operation and to select an application program from a menu of host application programs presented on said peripheral device display, wherein in response to input to the user interface to initiate operation of the scanner, an alert signal is communicated over said communication link to the host, and data scanned by operation of the scanner is transferred to and stored by said memory;

wherein said host is responsive to the alert signal by communicating with the peripheral device to identify the host application program selected by said user input, and said host processor is operable to convert said scanned data to a file format compatible with said selected application program and to load the formatted file in said selected application program.

23. A computer system according to claim 22, wherein said application programs include at least a word processing application and a spreadsheet application program.

24. A computer system having a host and a peripheral device, and a communications link operable to enable communication between said host and said peripheral device, said host including a processor having access to memory and supporting a plurality of application programs, including at least scan functionality, said peripheral device comprising:

a scanner operable to generate scan data and having a user interface including a display, said user interface operable to provide user input to the peripheral device including input to select one or more parameters for use in conjunction with the scanner operation and to select an application program from a menu of host application programs presented on said peripheral device display, wherein in response to input to the user interface to initiate operation of the scanner, an alert signal is communicated over said communication link to the host, and data scanned by operation of the scanner is transferred to and stored by said memory without storage at said peripheral device;

wherein said host is responsive to the alert signal by communicating with the peripheral device to identify the host application program selected by said user input, and said host processor is operable to convert said scanned data to a file format compatible with said selected application program and to load the formatted file in said selected application program.

25. A computer system according to claim 24, wherein said application programs include at least a word processing application and a spreadsheet application program.

* * * * *